Sept. 13, 1960 J. SUCHET 2,952,598
PREPARATION OF METALLIC CARBIDES
Filed July 15, 1958
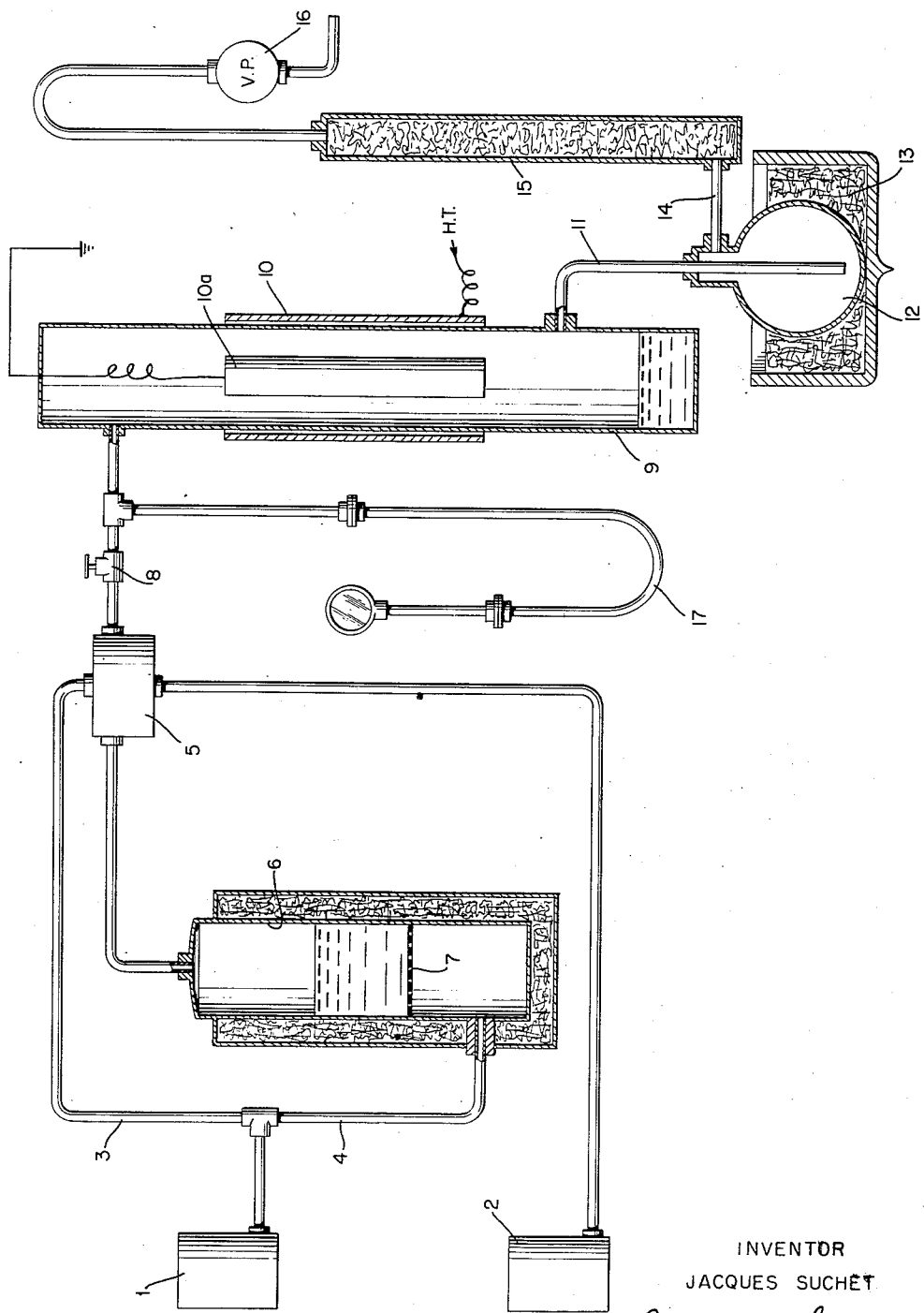
INVENTOR
JACQUES SUCHET
BY Bauer and Seymour
ATTORNEYS

United States Patent Office 2,952,598
Patented Sept. 13, 1960

---

2,952,598

PREPARATION OF METALLIC CARBIDES

Jacques Suchet, Gif-sur-Yvette, France, assignor to Compagnie de St. Gobain, Paris, France Filed July 15, 1958, Ser. No. 748,676

Claims priority, application France July 17, 1957

7 Claims. (Cl. 204—164)

This invention relates to the synthesis of carbides of metallic elements of the 4th, 5th and 6th groups of the periodic classification of the elements. By "metallic elements" we mean not only true metals, but also metalloids and elements of metallic character, of which silicon is an outstanding example.

It was set forth in copending application Serial No. 686,785, filed September 27, 1957, now abandoned, that if a gaseous compound of a metallic element of the 4th, 5th and 6th groups and a gaseous reducing agent were subjected to a high-frequency electrical discharge in the presence of a reducing agent such as hydrogen, the metallic element itself could be recovered in a state of high purity. The reaction which occurs is one of disintegration and is carried out out of contact with electrodes or other elements that might react with the metallic element. In one form, a continuous induced current having an intensity of 5 kilowatts and a frequency of 1 megacycle per second was used. In another example, an induced current was used having a pulse duration of about 1 microsecond, a frequency of about 500 pulses per second, a mean power of 500 watts, a wavelength of about 10 centimeters, and a carrier wave frequency of about 3,000 megacycles. A useful apparatus was described.

In copending application Serial No. 730,108, filed April 22, 1958, it was discovered that equal or superior results could be obtained by disintegrating vaporized compounds of the metallic elements of the 4th, 5th and 6th groups of the periodic table by subjecting the vapors to condenser discharge. The raw materials included halogenated, hydrogenated and alkylated compounds of metallic elements of the 4th, 5th and 6th groups. That case was also a disintegration, producing metallic elements of high purity. Both cases passed volatile compounds of the metallic element to be prepared, or mixtures of these volatile compounds with a gaseous reducing agent, through a reaction vessel in which the volatile composition was submitted out of contact with electrodes to high-frequency induced electrical discharges, either, in the first case, by means of a solenoid or, in the second case, by condenser discharge.

The applicant has now discovered that the processes described in the foregoing cases can be employed in the synthesis of compounds of high purity. In particular, it has been discovered that carbides of metallic elements of the 4th, 5th and 6th groups of the periodic table can be prepared in a state of high purity by generating a high-frequency electrical discharge in a gas comprising a vaporized compound of a metallic element of the said groups in admixture with a hydrocarbon. Thus, according to the invention, one may pass through a reaction chamber a gaseous mixture containing a halogenated metallic element of the 4th, 5th or 6th groups and a hydrocarbon, the carbide of the metallic element being produced as a result of the induced high-frequency discharge.

The accompanying drawing is a schematic representation of an apparatus adapted to carry out the invention. This apparatus will be described in connection with the first example.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

Example 1

Referring to the drawing, a reservoir 1 contains a hydrocarbon which is sent in gas phase through pipe 4 to the bottom of a bubbler 6 which contains a perforated plate 7, for example of fritted glass, beneath which the pipe 4 discharges and above which boron trichloride or other vaporizable metallic compound is placed. As the hydrocarbon bubbles through the boron trichloride, the latter is vaporized and carried to the mixer 5. Additional hydrocarbon can be sent directly to the mixer through conduit 3 if desired. In some cases it is useful to add some additional reducing agent in gas form to mixer 5, and for this purpose a reservoir 2 is provided, usually filled with hydrogen. The receptacle 6 is kept within a compartment which is maintained at a temperature providing a satisfactory rate of vaporization for the raw material. The mixed gases leave the mixer 5, pass through a valve 8 to a reaction chamber 9 which is maintained at the pressure desired, in this case reduced pressure, by a vacuum pump 16 with a manometer 17. The reaction chamber is supplied with electrodes 10, 10-a forming plates of a condenser, of which 10-a is connected to ground and 10 to a high-voltage generator. The current and power employed may be as described in the identified copending applications and as indicated hereinabove. As the gas from the valve 8 flows through the reaction chamber 9, it is subjected to the high-frequency discharges. Gases issuing from the reaction chamber pass through conduit 11 to trap 12, which is immersed in a mixture of alcohol and carbon dioxide snow 13 which captures the undecomposed boron trichloride by condensation, as well as secondary products of reaction. The residual gases issuing from the trap by conduit 14 pass through a column 15 containing caustic soda, which captures hydrochloric acid resulting from the reaction which forms the carbide.

The main reaction is as follows:

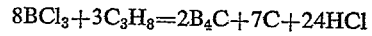

$$8BCl_3 + 3C_3H_8 = 2B_4C + 7C + 24HCl$$

The column 15 is connected to the vacuum pump 16 which maintains the desired pressure in all of the apparatus situated downstream of valve 8. In this example, propane was used as the hydrocarbon, but this is merely illustrative, as any hydrocarbon, capable of being maintained in gas form under the circumstances of the reaction, is useful.

The bubbler 6 was charged with boron trichloride and maintained at 4° C. by circulating brine from a refrigerating machine connected to the installation. 30 liters per hour of propane were passed through the bubbler, the conduit 3 being closed so that all the propane passed through the boron trichloride. The source of hydrogen 2 was not resorted to. The mixture of propane and boron trichloride thus provided was subjected in the reactor to a discharge at a pressure of 20 millimeters of mercury. Electrodes 10 and 10-a were supplied with a high-frequency current of 10 kilowatts and a frequency of 1 megacycle per second.

After 6 hours of treatment, 32.5 grams of black, very hard, very fine powder were obtained, representing a yield of 12% based on a consumption of 2.25 kilograms of BCl₃. This boron carbide contained very little free carbon.

Example 2

In the preceding example, boron trichloride was replaced by silicon tetrachloride. The bubbler was carried to a temperature of 45° C. and the temperature was maintained by a thermostat while 30 liters of propane per hour were passed through. The pressure in the reactor was kept between 10 and 22 millimeters of mercury. After 6 hours of operation, using the same electrical conditions as in Example 1, 135 grams of black silicon carbide containing 26% of free carbon were recovered. After calcination of the mass to remove the carbon, there were obtained 100 grams of pure silicon carbide. The consumption of silicon tetrachloride was 2.450 kilograms, so that the yield was 17%–18%.

Example 3

In the same way, titanium carbide was made from titanium tetrachloride and propane.

These examples are illustrative of the general applicability of the process to the production of carbides of the metallic elements of the 4th, 5th and 6th groups.

The reactions described above are accompanied by side reactions which explain the relatively low yields. Among the secondary reactions are the formation of volatile compositions such as $BHCl_2$, $BH_2Cl$, $SiHCl_3$, $SiHCl_2$, $CCl_4$, all of which can be isolated if desired, or recycled for further high-frequency treatment.

The advantage of the invention is the production of carbides of metallic elements of the 4th, 5th and 6th groups of the periodic table in a state of high purity.

As many apparaently widely different embodiments of the present invention may be made without departing from the spirit and scope thereof, it is to be understood that the invention is not limited to the specific embodiments.

What is claimed is:

1. A method of making a carbide of a metallic element of the 4th, 5th and 6th groups of the periodic table that comprises subjecting a mixture of a hydrocarbon and a vaporizable metallic halide of a metal of one of said groups in vapor phase, to high-frequency electrical discharge having a minimum frequency about 1 megacycle.

2. A method of making a carbide of a metallic element of the 4th, 5th and 6th groups of the periodic table that comprises subjecting a gaseous mixture of a hydrocarbon and a metallic halide of an element belonging to a said group to high-frequency electrical discharge having a frequency minimum about 1 megacycle and separating carbide from the reaction product.

3. A method of making a carbide of a metallic element of the 4th, 5th and 6th groups of the periodic table that comprises generating a high-frequency electrical discharge having a frequency minimum about 1 megacycle in mixed gaseous reactants consisting essentially of a hydrocarbon and a halogenated compound of a metallic element belonging to said groups, and separating the carbide from the reaction product.

4. A method of making boron carbide that comprises subjecting a gaseous mixture of boron chloride and propane to high-frequency discharge at a pressure of about 20 millimeters of mercury and a frequency minimum about 1 megacycle.

5. A method of making silicon carbide that comprises subjecting a gaseous mixture of propane and silicon tetrachloride at a pressure between about 10 and 22 millimeters of mercury to high-frequency electrical discharge having a frequency minimum about 1 megacycle in the absence of other reactable materials and calcining the mass.

6. A method of making silicon carbide that comprises subjecting a volatilized mixture of propane and silicon tetrachloride at a pressure between about 10 and 22 millimeters of mercury to high-frequency electrical discharge having a frequency minimum about 1 megacycle in the absence of other reactable materials.

7. A method of making titanium carbide that comprises passing a mixture of a hydrocarbon and titanium tetrachloride in gas phase through a reaction chamber, generating a high-frequency discharge having a frequency minimum about 1 megacycle in the mixture, and isolating the titanium carbide from the reaction product.

References Cited in the file of this patent

UNITED STATES PATENTS

| Number | Name | Date |
|---|---|---|
| 862,092 | Morehead | July 30, 1907 |
| 1,576,275 | Hartmann | Mar. 9, 1926 |
| 2,089,966 | Kassner | Aug. 17, 1937 |
| 2,257,177 | Luster | Sept. 30, 1941 |